(12) United States Patent
Skov

(10) Patent No.: US 7,971,940 B2
(45) Date of Patent: Jul. 5, 2011

(54) WHEEL DESIGN

(75) Inventor: Erik Lee Skov, Akron, OH (US)

(73) Assignee: Rubbermaid Incorporated, Huntersville, NC (US)

( * ) Notice: Subject to any disclaimer, the term of this patent is extended or adjusted under 35 U.S.C. 154(b) by 102 days.

(21) Appl. No.: 12/329,539

(22) Filed: Dec. 5, 2008

(65) Prior Publication Data

US 2009/0146492 A1  Jun. 11, 2009

Related U.S. Application Data

(60) Provisional application No. 61/005,781, filed on Dec. 7, 2007.

(51) Int. Cl.
*B60B 27/00* (2006.01)
*B29C 49/00* (2006.01)
(52) U.S. Cl. .................. 301/64.701; 301/105.1
(58) Field of Classification Search .......... 301/64.701, 301/64.702, 64.703, 64.704, 64.705, 64.706, 301/64.707, 105.1, 65
See application file for complete search history.

(56) References Cited

U.S. PATENT DOCUMENTS

| | | | | |
|---|---|---|---|---|
| 2,766,802 A * | 10/1956 | Grobowski | ............. | 152/384 |
| 3,062,254 A * | 11/1962 | Keefe | ............. | 152/7 |
| 4,530,543 A * | 7/1985 | Keane | ............. | 301/64.707 |
| 4,634,189 A * | 1/1987 | LeBlond et al. | ......... | 301/64.704 |
| 4,682,393 A * | 7/1987 | Corkery | ............. | 492/56 |
| 5,026,106 A * | 6/1991 | Biermann | ............. | 295/1 |
| 5,104,198 A * | 4/1992 | Prout et al. | ............. | 301/64.705 |
| 5,368,371 A * | 11/1994 | Markling | ............. | 301/64.701 |
| 6,139,115 A * | 10/2000 | Hsieh | ............. | 301/105.1 |
| 6,170,920 B1 * | 1/2001 | Markling | ............. | 301/111.01 |
| 6,428,114 B1 * | 8/2002 | Sebode | ............. | 301/64.705 |
| 6,464,305 B2 * | 10/2002 | Markling | ............. | 301/111.03 |
| 7,393,495 B2 * | 7/2008 | Grinnall et al. | ............. | 264/534 |
| 2004/0232637 A1 * | 11/2004 | Butler | ............. | 280/47.26 |
| 2009/0127923 A1 * | 5/2009 | Morris | ............. | 301/64.707 |

* cited by examiner

*Primary Examiner* — Kip Kotter
(74) *Attorney, Agent, or Firm* — Esther F. Queen; Dennis J. Williamson; Moore & Van Allen PLLC

(57) ABSTRACT

Embodiments of the present invention are directed at least to a plastic wheel, methods of making a plastic wheel and a waste receptacle. The wheel has a wheel body and a hub. The hub has an outer wall, an inner wall and a central bore orientated along an axis that the hub extends along. The outer wall of the hub has been compressed inwardly toward the inner wall, providing greater structural support for the hub.

9 Claims, 14 Drawing Sheets

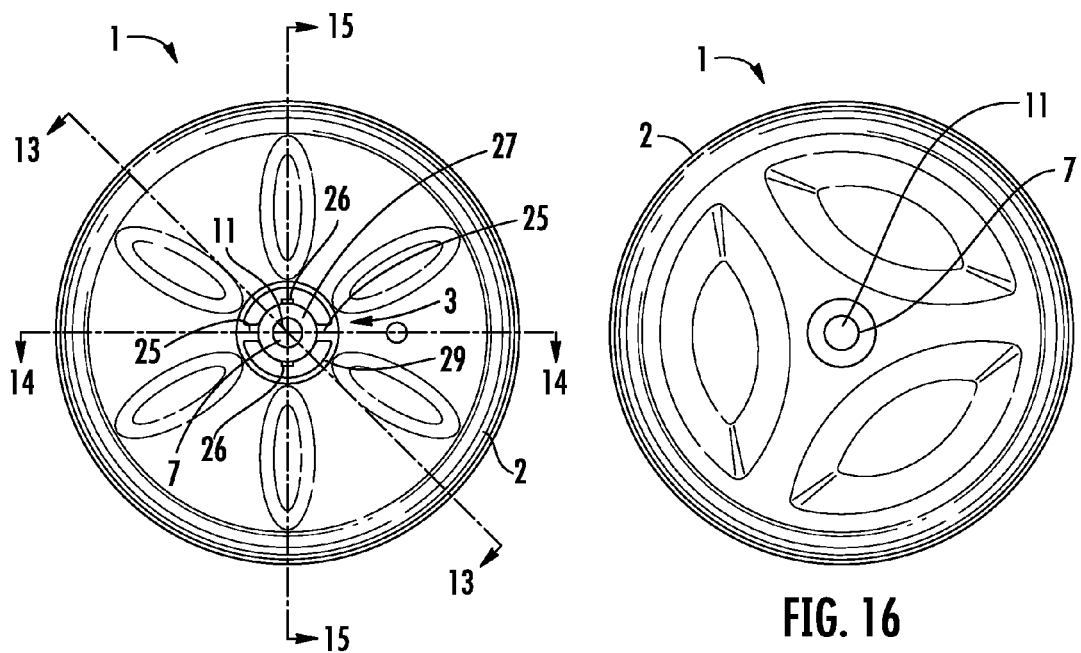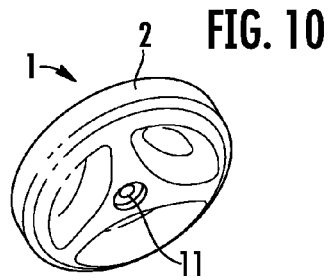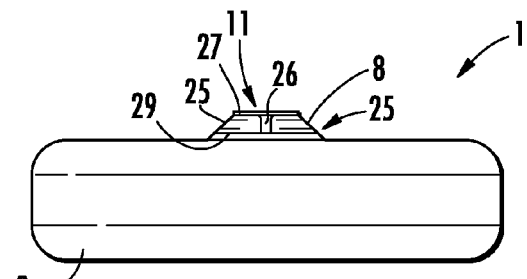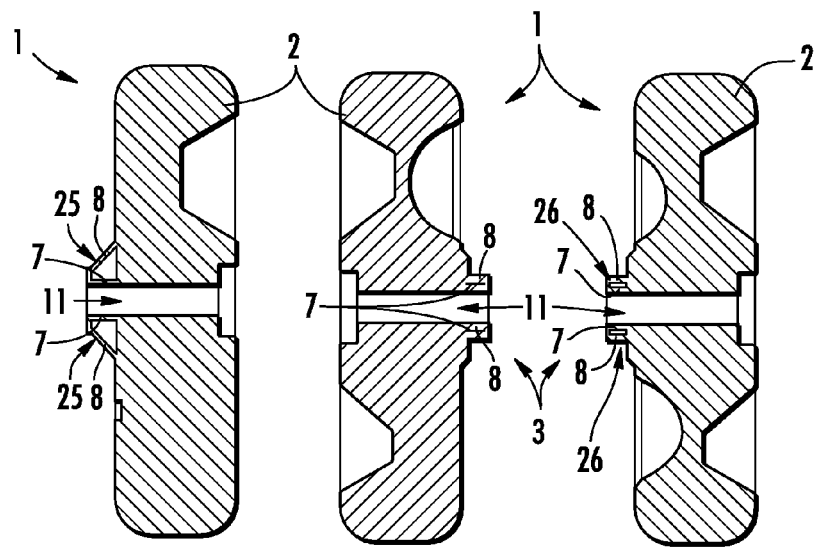

WHEEL DESIGN

CROSS REFERENCE TO RELATED APPLICATIONS

This application claims benefit of priority under 35 U.S.C. §119(e) to the filing date of U.S. Provisional Application No. 61/005,781, as filed on Dec. 7, 2007, which is incorporated herein by reference in its entirety.

BACKGROUND

Plastic wheels for various applications are known. These wheels are prone to collapse when a certain amount of forces are applied thereto. An improved wheel design and method of manufacture is disclosed to provide enhanced structural support.

SUMMARY

Embodiments of the present invention are directed to a molded plastic wheel adapted to mount to an axle or other object. The molded plastic wheel has a wheel body and a hub. The hub has an outer wall, an inner wall and a central bore orientated along an axis that the hub extends along. The outer wall of the hub is compressed inwardly toward the inner wall, providing greater structural support for the hub.

In addition, other embodiments of the present invention are directed to a method of making a plastic wheel. The method includes providing a mold and blow molding plastic (or any other material) into the mold. This forms a wheel having a wheel body and a hub, the hub extending from the wheel body and comprising an outer wall and an inner wall. The outer wall of the hub is compressed to decrease the distance between the outer wall and the inner wall so that the hub is structurally strengthened. In one embodiment, hydraulic slides are used to compress the outer wall of the hub.

Further, yet another embodiment of the present invention is directed to a waste receptacle. The waste receptacle includes a container for receiving material and at least one wheel rotatably attached to the container. Each wheel includes a wheel body and a hub. The hub includes an outer wall, an inner wall and a central bore orientated along an axis. The outer wall of the hub is compressed inwardly toward the inner wall.

In addition, still yet another embodiment of the present invention is directed to a cooler. The cooler includes an insulated container for receiving material and at least one wheel rotatably attached to the container. Each wheel includes a wheel body and a hub. The hub includes an outer wall, an inner wall and a central bore orientated along an axis. The outer wall of the hub is compressed inwardly toward the inner wall.

BRIEF DESCRIPTION OF THE DRAWINGS

FIG. 10 is a front view of a wheel having the hub of FIG. 6C.

FIG. 11 is a back perspective view of the wheel in FIG. 10.

FIG. 12 is a bottom view of the wheel in FIG. 10.

FIG. 13 is a section view of the wheel of FIG. 10 taken along line 13-13.

FIG. 14 is a section view of the wheel of FIG. 10 taken along line 14-14.

FIG. 15 is section view of the wheel of FIG. 10 taken along line 15-15.

FIG. 16 is a back view of the wheel of FIG. 10.

DETAILED DESCRIPTION OF EMBODIMENTS OF THE INVENTION

Figure 1:
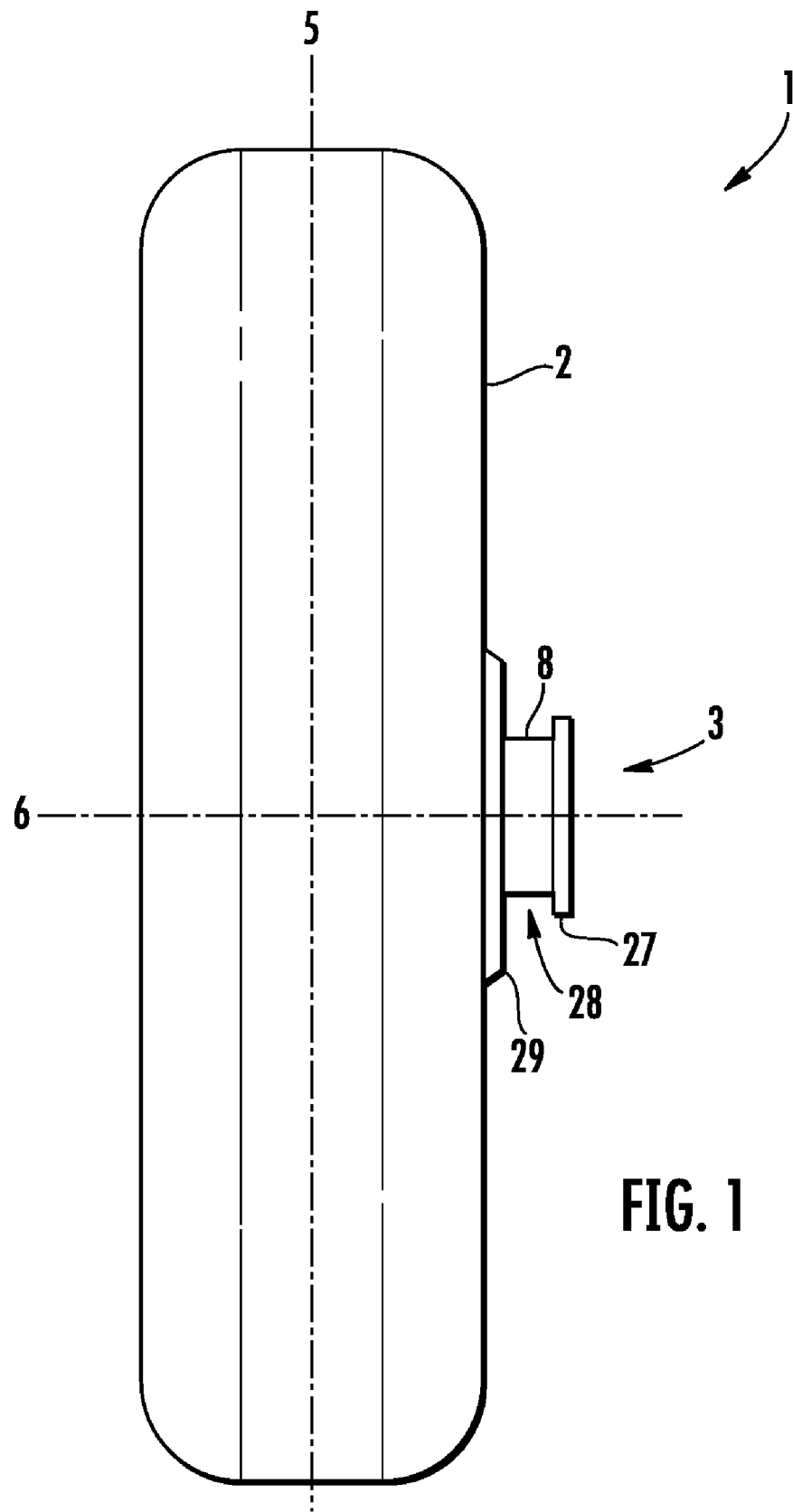
FIG. 1 is a side view of one embodiment of the wheel of the present invention.
Figure 2:
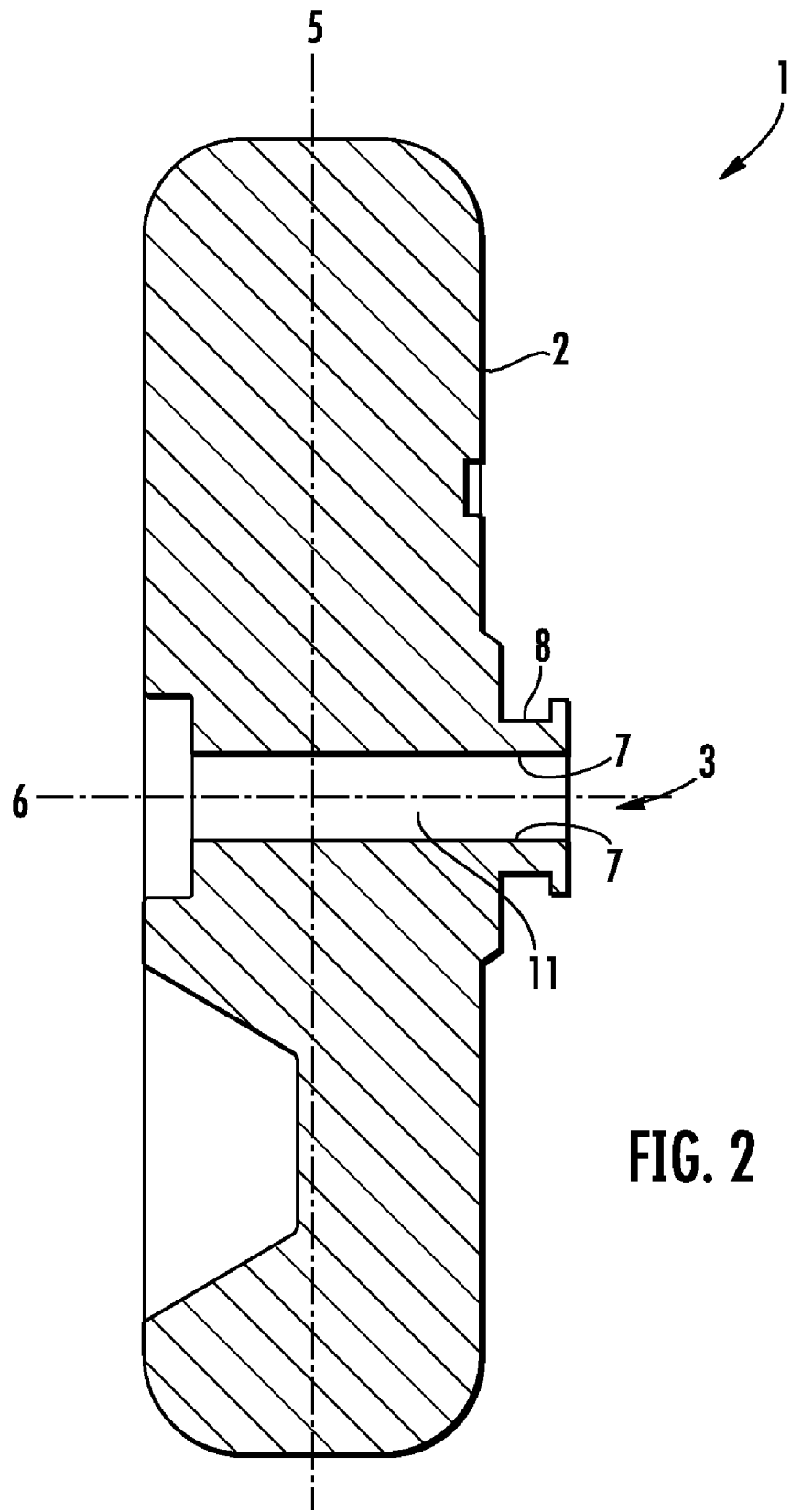
FIG. 2 is a section view of the wheel of FIG. 1.

Referring generally to FIGS. 1-20, various embodiments of the wheel of the invention are generally shown at 1. Wheel 1 is made up of a wheel body 2 and a disc-shaped compressed hub 3 that extends laterally from the wheel body 2, as illustrated in FIG. 1. As shown in FIG. 2, the wheel 1 has a central bore 11 extending through the center of the wheel body 2 and hub 3 along axis 6 about which the wheel 1 can rotate. Central bore 11 is oriented perpendicular to plane 5 where plane 5 defines the plane in which the wheel rotates. Central bore 11 is typically sized to receive an axle (not shown).

The compressed hub 3 has an outer wall 8 and an inner wall 7, as will hereinafter be described. The exemplary embodiments illustrate one compressed hub 3 per wheel 1, but it should be understood that each wheel 1 may include a hub 3 on each side of the wheel body 2. Wheel 1 is suitable for use on lawn mowers, trash containers, coolers, toy wagons, and other similar movable devices, as is described later with regard to FIG. 20.

Wheel 1 may be made of one or more polyolefin materials, including but not limited to polypropylene (PP), low density polyethylene (LDPE), high density polyethylene (HDPE), ethylene, propylene, butenes, isoprenes, pentenes, copolymers, or any other polymer and any modifications thereof. Other materials that may make up wheel 1 include acrylonitrile-butadiestryrene, nylon, acetate-cellulose, acrylic-polymethlacrilate, polystyrene, polythene, polyvinyl chloride, polyester resin, melamine formaldehyde, elastomers or the like. In addition to these materials, wheel 1 may also comprise other materials, including metals, various types of rubber, wood, or any other material with durable characteristics. Additives to wheel 1 may include stabilizers, lubricants, pigments, plasticizers, fillers, flame retardants, blowing agents, antistatic agents, or the like.

Wheel 1 may be constructed by any blow molding machine. A number of different blow molding machines may be used in fabricating wheel 1 including: continuous extrusion, injection, co-extrusion, extrusion, reciprocating screw, stretch blow molding or the like. Extrusion blow molding machines may be best suited in fabricating wheel 1; however, other types of blow molding machines may also be used to fabricate wheel 1. It should be understood that embodiments of the present invention should not be limited to fabrication using any particular molding process or machine.

Figure 3C:
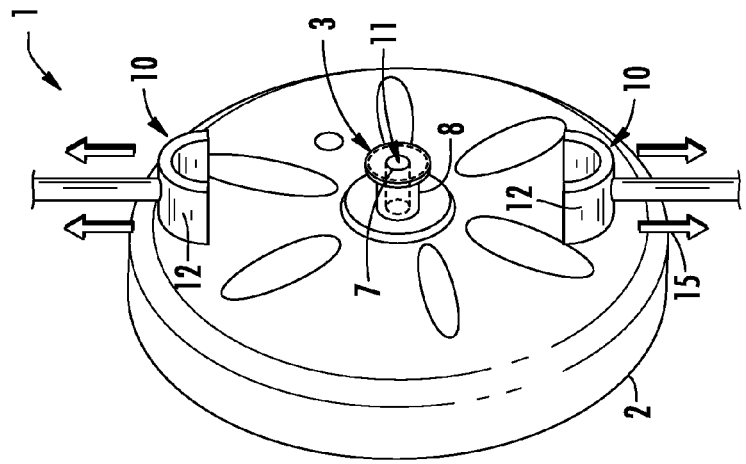
FIGS. 3A-C show an exemplary method of forming the wheel of FIG. 1.
Figure 3B:
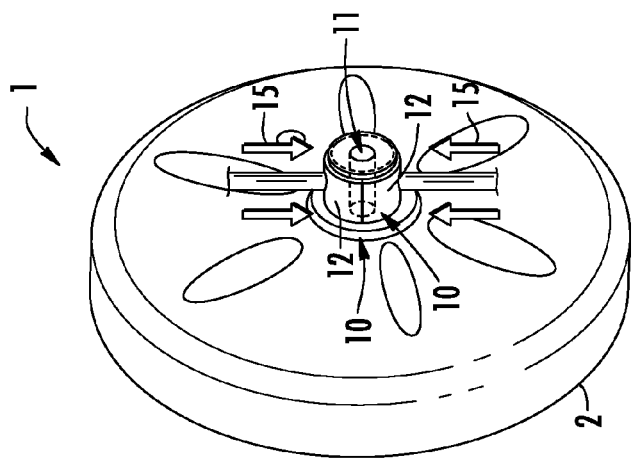
Figure 3A:
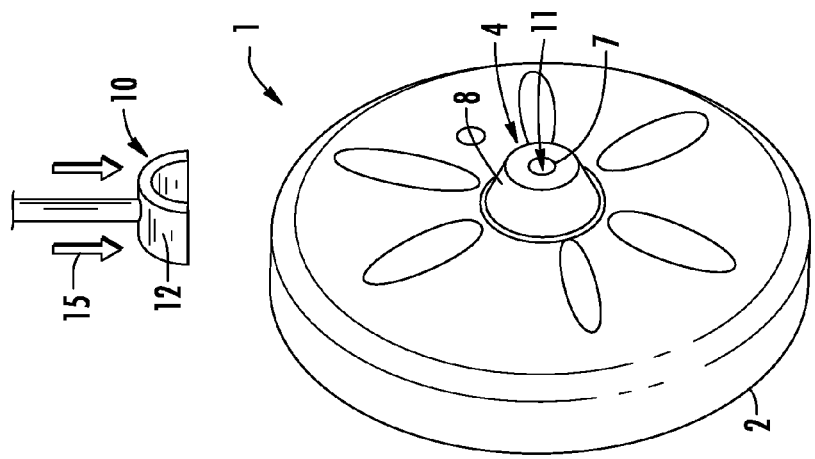
Figure 4C:
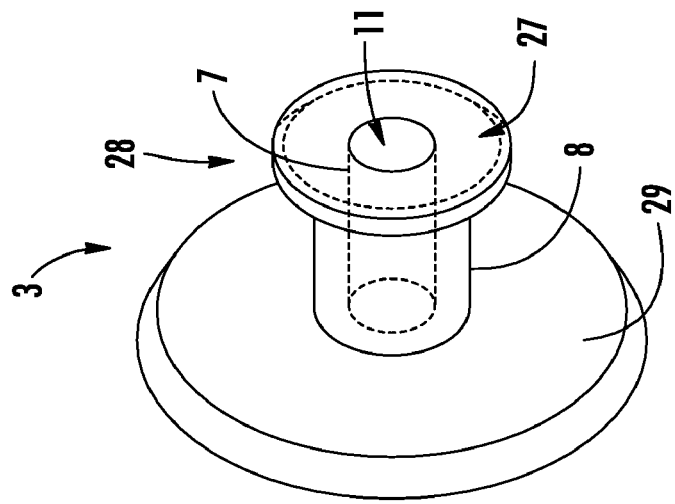
FIGS. 4A-C show the method of FIGS. 3A-C.
Figure 4B:
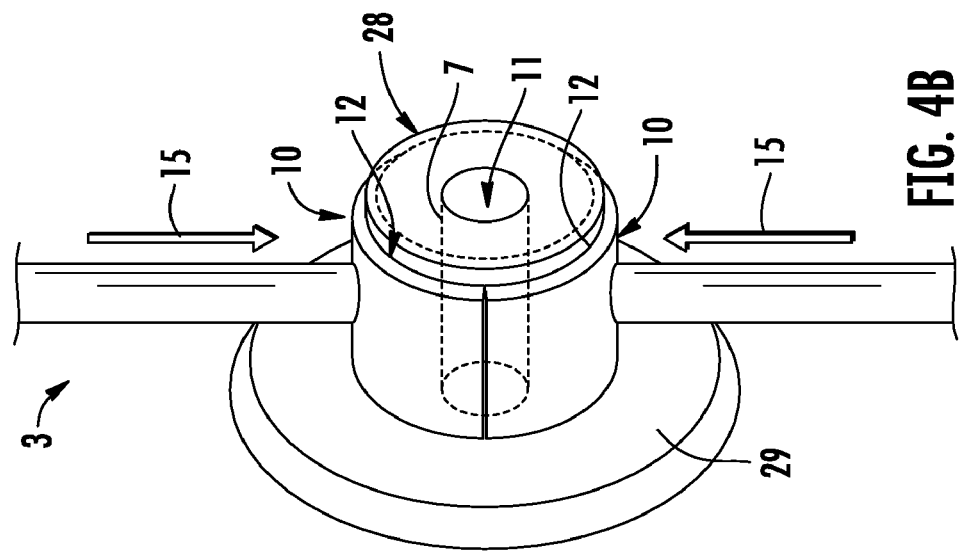
Figure 4A:
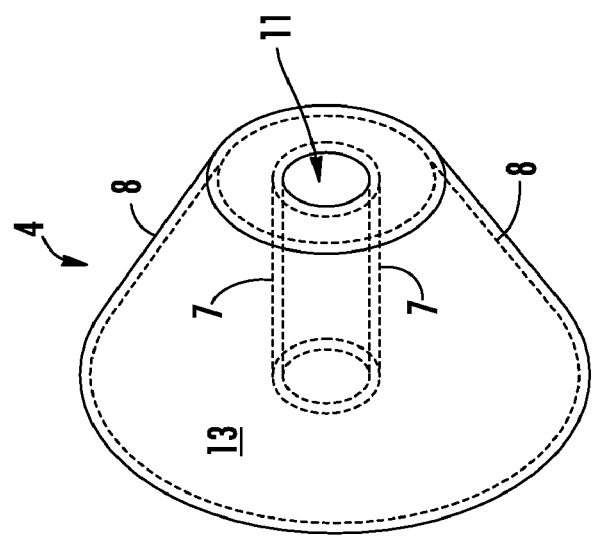

In one embodiment, wheel 1 is initially constructed by using a preformed mold (not shown) by extrusion blow molding technique, immediately and integrally forming a wheel body 2 and a blow molded uncompressed hub 4, as illustrated in FIGS. 3A and 4A. The preformed mold shapes the exterior surface of the resultant blow molded product. The wheel body 2 and the hub 4 are integrally blow molded so that the walls of the wheel body 2 and the inner and outer walls 7, 8 of the hub 4 are integrated together, forming a unitary wheel structure. The walls of the wheel body 2 and the inner and outer walls 7, 8 of the uncompressed hub 4 may be made of the same material and/or have the same density.

The preformed mold may be of any shape or size. In one embodiment, the preformed mold may generally be of a disc shape. This allows wheel body 2 to have a disc shape so that wheel 1 is capable of rolling. The preformed mold functions to integrally form uncompressed hub 4 and wheel body 2.

Figure 7:
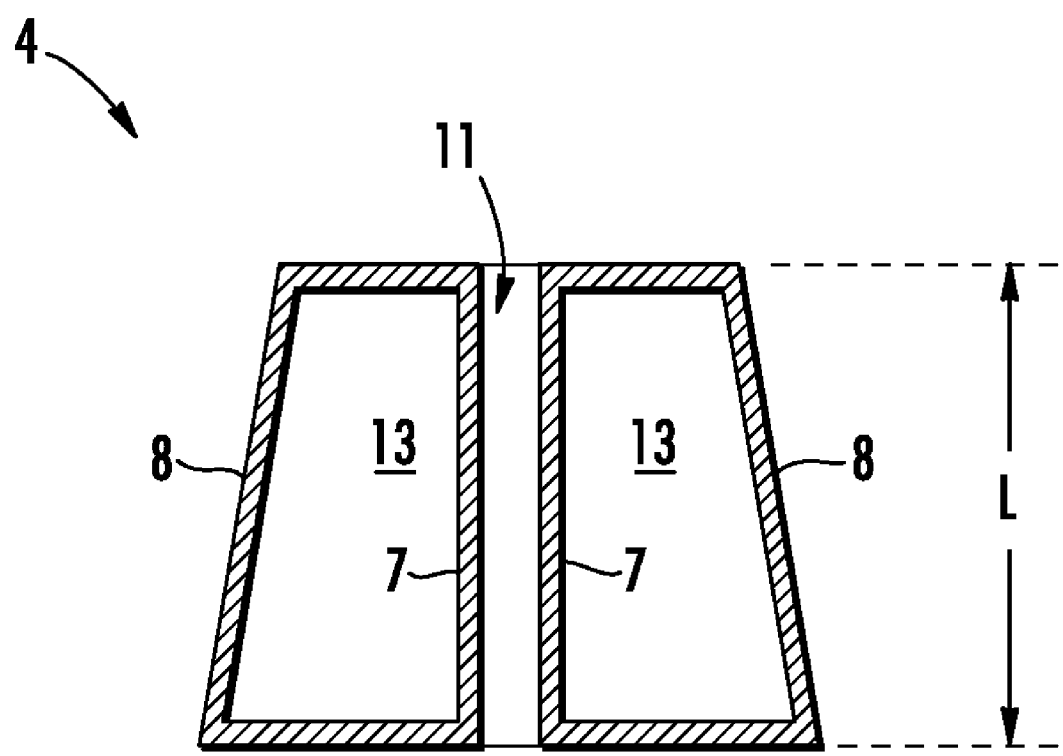
FIG. 7 is a section view of the uncompressed hub of FIG. 4A taken along a plane that traverses the longitudinal axis of the hub.

In the illustrated embodiment of FIG. 4A, uncompressed hub 4 generally has a cylindrical or truncated conical body. Uncompressed hub 4 has an inner wall 7 and an outer wall 8, as shown in the cross-sectional view of the uncompressed hub 4 in FIG. 5. Inner wall 7 generally forms a cylindrical shape that is at least large enough to receive an axle (not shown). Outer wall 8 may be of any size or shape. Uncompressed hub 4 also has a hollow interior cavity 13 (as shown in FIGS. 4A and 7) formed between inner wall 7 and outer wall 8 of hub 4. Interior cavity 13 has a generally annular shape and surrounds the central bore 11. In one embodiment, the interior cavity 13 is filled with air or other type of gas. In another embodiment, interior cavity 13 is filled with a liquid and/or a solid material via injection molding or any other process.

After wheel body 2 and uncompressed hub 4 have been formed via the blow molding process, the outer wall 8 of the uncompressed hub 4 is compressed, as shown in FIGS. 3A-3C and FIGS. 4A-4C. Such compression may be performed by any means, including any compression device. The compression device may be any mechanical apparatus, such as any pneumatic means or the like. In the illustrative embodiments of FIGS. 3A-3C and FIGS. 4A-4C, one or more hydraulic slides 10 are used to compress the outer wall 8. Each hydraulic slide 10 has a rigid arcuate compression surface 12 and is movable to make contact with the outer wall 8 of hub 4. The configuration and shape of the hydraulic slides 10 may be varied so as to vary the size and shape of the compressed hub 3 and/or to form at least one rib 25-27.

Figure 8A:
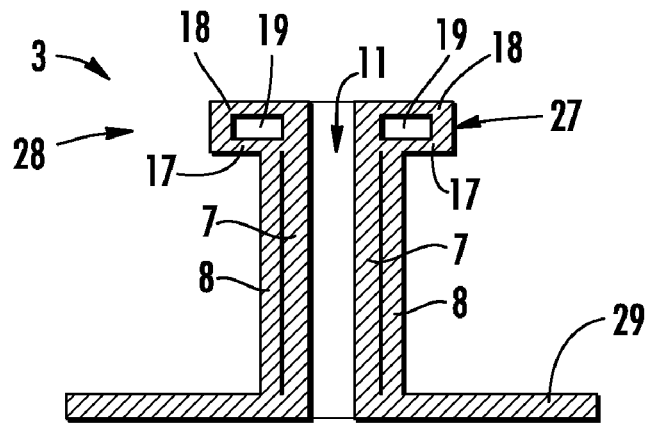
FIG. 8A is a section view of the embodiment of the hub of FIG. 4C taken along a plane that traverses the longitudinal axis of the hub.

In FIGS. 3A-3C and FIGS. 4A-4C, two hydraulic slides 10 are moved so that compression surfaces 12 of the hydraulic slides 10 surround at least a portion of the outer wall 8 of uncompressed hub 4. Heat may be applied to the uncompressed hub 4 to facilitate deformation via the hydraulic slides 10. Hydraulic slides 10 then compress outer wall 8 towards inner wall 7 deforming outer wall 8. The direction of compression is shown at 15 in FIGS. 3A, 3B and 4B. The compression by the hydraulic slides 10 may decrease the volume of the interior cavity 13 between at least a portion of the outer wall 8 and the inner wall 7. In one embodiment, the hydraulic slides 10 substantially eliminate the volume of the hollow interior cavity 13, as shown in FIG. 8A. The amount of compression of the outer wall 8 toward the inner wall may cause one or more portions of the inner wall 8 and outer wall 8 to weld or integrate together where contact occurs. According to some embodiments, outer wall 8 may be compressed any distance towards inner wall 7 so as to increase the plastic density and/or rigidity of compressed hub 3. Any portion of the hub 4 may be compressed along the full hub length L (FIG. 7). In one embodiment, multiple portions of the hub 4 may be compressed.

Figure 5C:
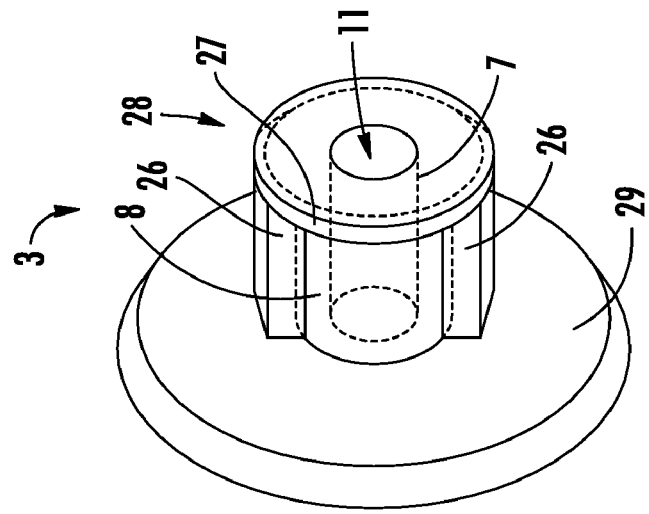
FIGS. 5A-C show another method of forming a compressed hub according to another embodiment of the present invention.
Figure 5B:
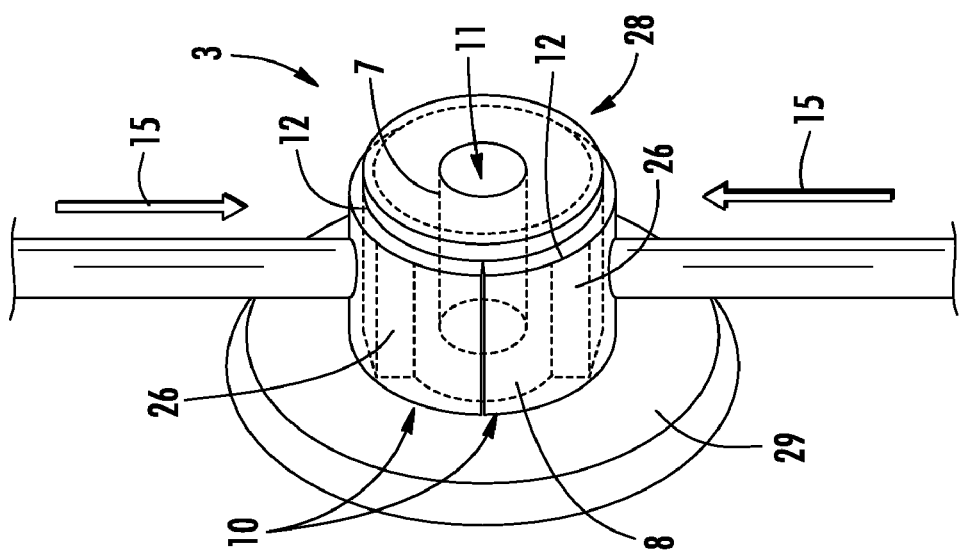
Figure 5A:
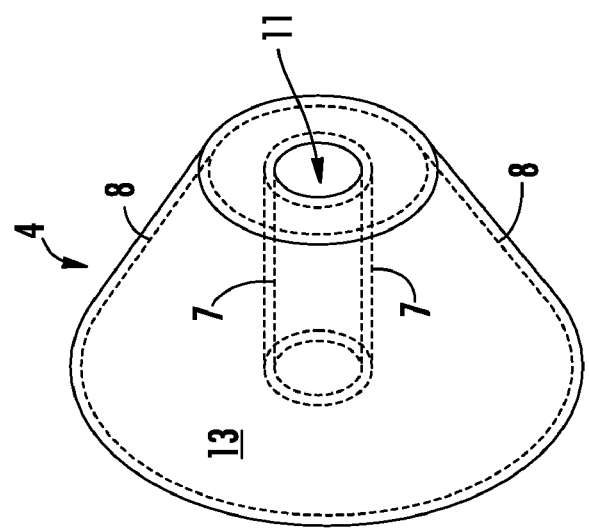

In FIGS. 5A-C, hub 3 is formed with a pair of ribs 26. In forming such hub 3, the outer wall 8 of the uncompressed hub 4 of FIG. 5A is compressed in a similar manner to the above-discussed process of FIGS. 4A-C. Further, during compression of the outer wall 8, as shown in FIG. 5B, the outer wall 8 conforms to the shape of the compression surface 12 of the hydraulic slides 10. In the illustrative embodiment of FIGS. 5B and 5C, a portion of the outer wall 8 conforms to a recess (not shown) of each hydraulic slide 10, forming rib 26. As such, rib 26 is a result of the recess of the hydraulic slide 10 not compressing a portion of the outer wall 8 the same amount as the other portions of the outer wall 8.

Figure 6C:
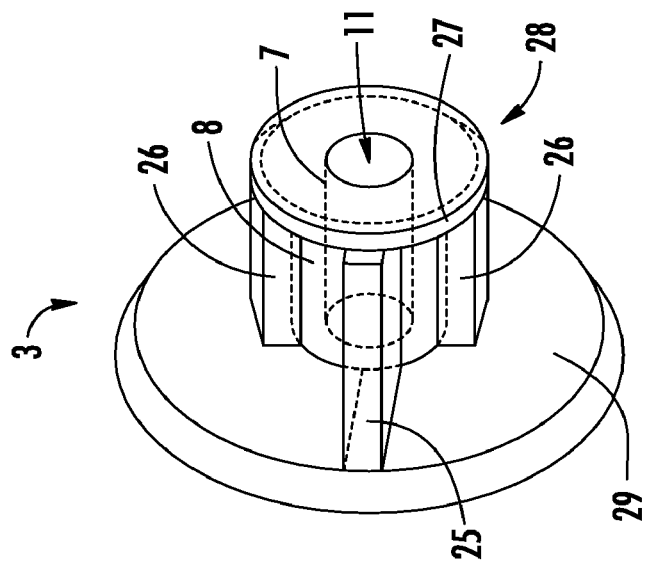
FIGS. 6A-C show yet another method of forming a compressed hub according to yet another embodiment of the present invention.
Figure 6B:
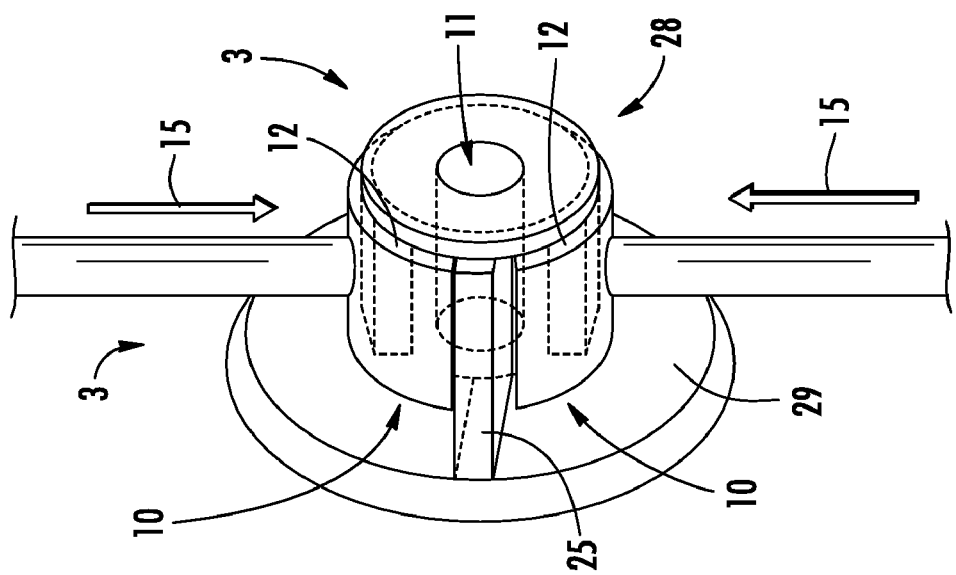
Figure 6A:
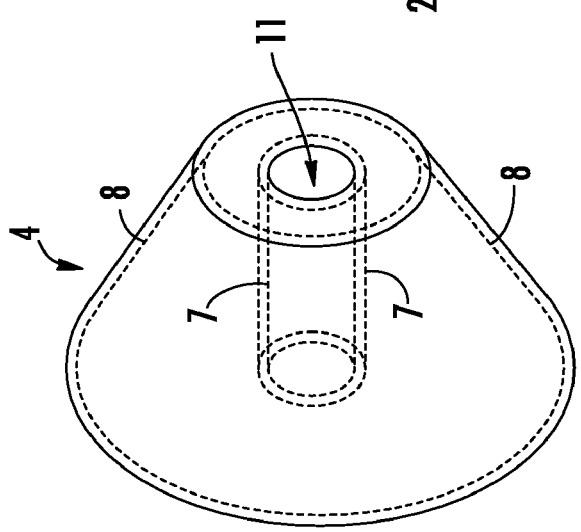

In FIGS. 6A-C, hub 3 is formed with two pairs of ribs 26 and 25. To form such hub 3, the outer wall 8 of the uncompressed hub 4 of FIG. 6A is compressed, similar to the process described above with regard to FIGS. 4A-C. However, the hydraulic slides 10 in FIG. 6B form a pair of ribs 25 by not compressing at least a portion of the outer wall 8. For example, in FIG. 6B, when compressing, the two hydraulic slides 10 do not meet together, leaving two portions of the outer wall 8 uncompressed and resulting in forming a pair of ribs 25. FIG. 6C shows the resulting hub 3 having two pairs of ribs 25 and 26, where one pair of ribs 26 are similar to the pair of ribs 26 shown and described above with respect to FIG. 5C. It should be noted that the interior area of ribs 25 and 26 may be hollow as a result of not being compressed.

Figure 8B:
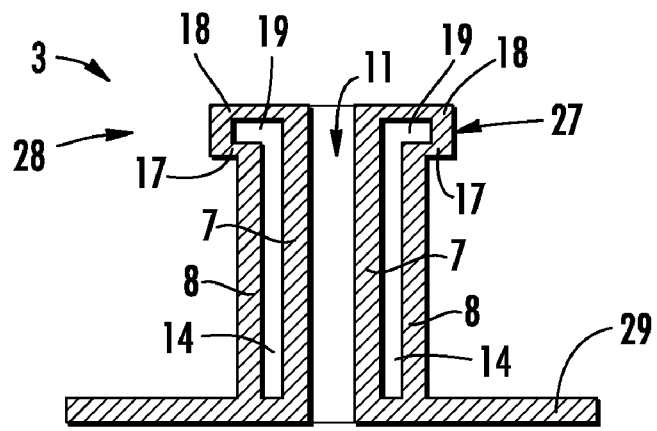
FIG. 8B is a section view of the hub of FIG. 1 taken along a plane that traverses the longitudinal axis of the hub.

Additionally, a flange 27 (FIGS. 4C-D, 5C-D, 6C-D and 8A-B) may be formed in hub 3 by not compressing the distal end 28 of the hub 4, which is located furthest from the wheel body 2. Flange 27 is parallel to plane 5 (FIG. 1) and perpendicular to central bore 11. As is best illustrated in FIGS. 1 and 8A-B, the hub 3 has a distal end 28 and a base wall 29 proximate to the wheel body 2. The inner wall 7 and outer wall 8 extend perpendicularly from the base wall 29 toward the distal end 28 of the hub 3. The distal end 28 of the hub 3 includes a first wall 17 and a second wall 18. The first wall 17 is perpendicular to the outer wall 8 and extends outwardly from the outer wall 8 away from the inner wall 7. The second wall 18 connects the first wall 17 with the inner wall 7. The first and second walls 17, 18 define a hub end cavity 19 therebetween, which may be separate from the interior cavity 14 of the compressed hub 3.

In any event, the outer wall 8 is compressed any distance inwardly toward the inner wall 7. For example, FIG. 8A illustrates a section view of the embodiment of the hub 3 of FIG. 4C, where the outer wall 8 is compressed so that no space or air is disposed between outer wall 8 and inner wall 7. Accordingly, the outer wall 8 is adjacent to and/or contacts the inner wall 7 so that the walls 7, 8 may weld together. In another embodiment, FIG. 8B is a section view of the compressed hub 3 where, after compression of the outer wall 8, some space or substance/material may still be disposed between the outer wall 8 and the inner wall 7. For example, any air (and/or other material) disposed between the outer wall 8 and the inner wall 7 of compressed hub 3 may be only 20% of the original amount of air (and/or other material) that was disposed between the outer wall 8 and inner wall 7 of uncompressed hub 4. In another embodiment, any material and/or air disposed between the outer wall 8 and inner wall 7 of uncompressed hub 4 may be compressed to increase the density of such material in the hub 4.

In another embodiment, compression of the outer wall 8 toward inner wall 7 increases the density of the material of the outer wall 8. Such density of the outer wall 8 is higher than the density of walls of the wheel body 2.

Figure 9:
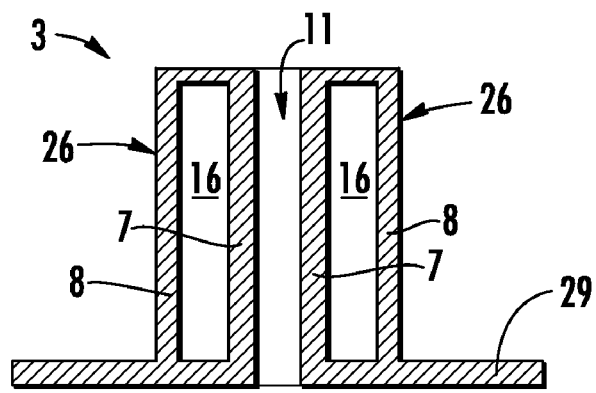
FIG. 9 is a section view of the hub of FIG. 5C taken along a plane that traverses through both the longitudinal axis of the hub and ribs.

As shown in FIG. 9, which is a cross-sectional view of the hub 3 and ribs 26 of FIG. 5C, each of the ribs 26 may have a hollow interior cavity 16 as a result of the outer wall 8 not being fully compressed to the inner wall 7. Both pair of ribs 25 and 26 may give structural support to compressed hub 3. As previously described, FIG. 1 illustrates the compressed hub 3 with no ribs, FIG. 5C shows compressed hub 3 with a pair of ribs 26, and FIG. 6C shows the hub 3 formed with two pairs of ribs 25 and 26.

FIGS. 10-18 illustrate wheel 1 having the compressed hub 3 of FIG. 6C. In these illustrations, ribs 25 and 26 and flange 27 are shown. The ribs 25 and 26 and flange 27 are formed via the compression of the outer wall 8 via two hydraulic slides 10 placed 180 degrees from each other, as previously discussed. This provides greater structural integrity of the hub to support an axle (not shown) received in the central bore 11. Wheel 1 is shown as having a compressed hub 3 with a central bore 11, two sets of ribs 25 and 26, and a flange 27.

Figure 17:
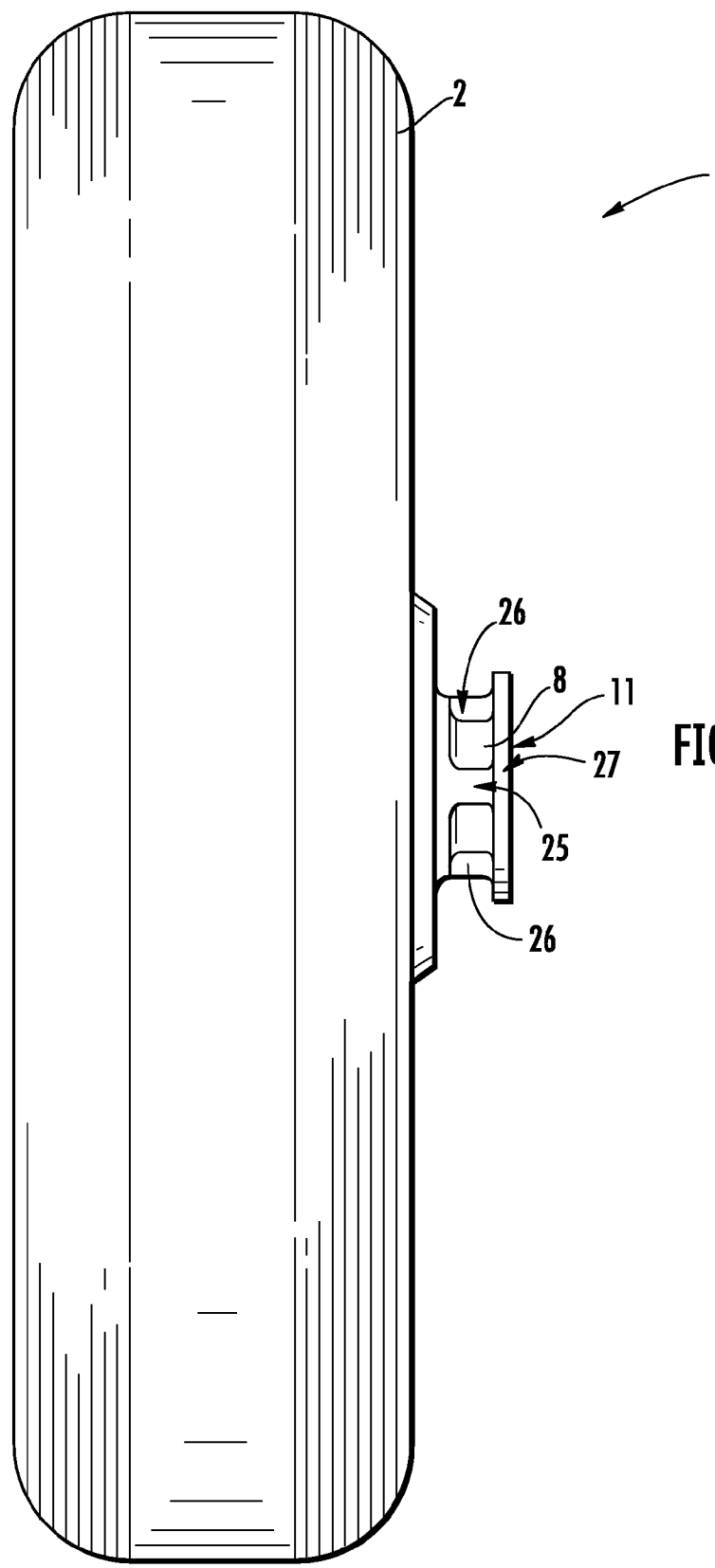
FIG. 17 is a side view of the wheel of FIG. 10.
Figure 18:
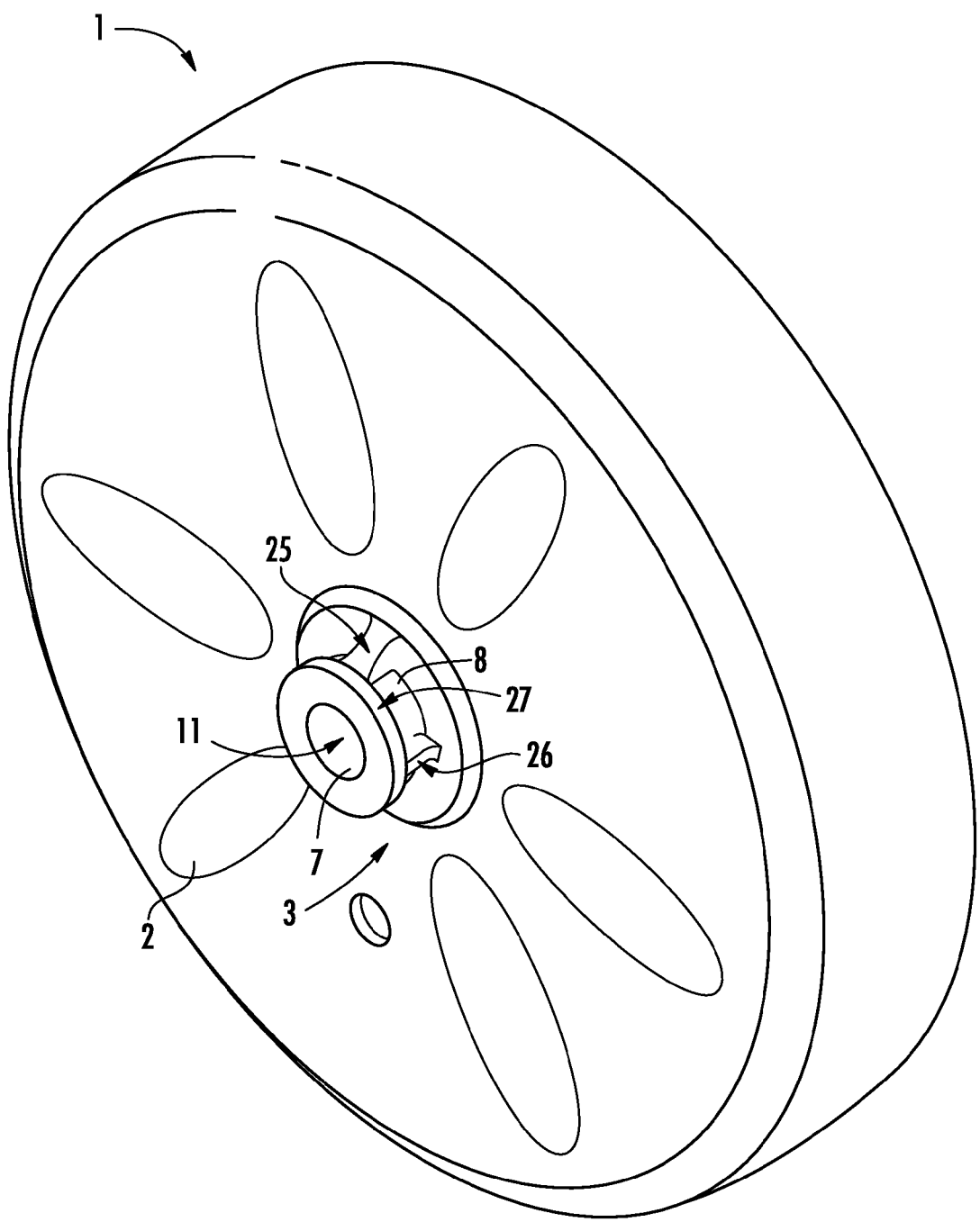
FIG. 18 is a front perspective view of the wheel of FIG. 10.

FIG. 13 illustrates a section view of wheel 1 through a section of the hub 3 having no ribs, FIG. 14 shows a section view through ribs 25, and FIG. 15 shows a section view through ribs 26. As shown in FIGS. 12, 14 and 18, ribs 25, 26 each angularly extend from the wheel body 2 to flange 27, which is located at the distal end 28 of the hub 3. FIG. 13 illustrates the outer wall 8 as adjacent to the inner wall 7. As shown in FIGS. 15 and 17, ribs 26 are parallel to the inner wall 7. Ribs 25-27 may each define a hollow interior cavity 16, 19. FIGS. 17 and 18 illustrate the flange 17 is concentric about the central bore 11 and parallel to the wheel body 2. Additionally, FIGS. 17 and 18 illustrate that the ribs 25 and 26 are substantially perpendicular to the central bore 11 and the wheel body 2. Further, ribs 25 and 26 may be curved and/or not aligned parallel to the central bore 11, as shown in FIG. 18.

Figure 19:
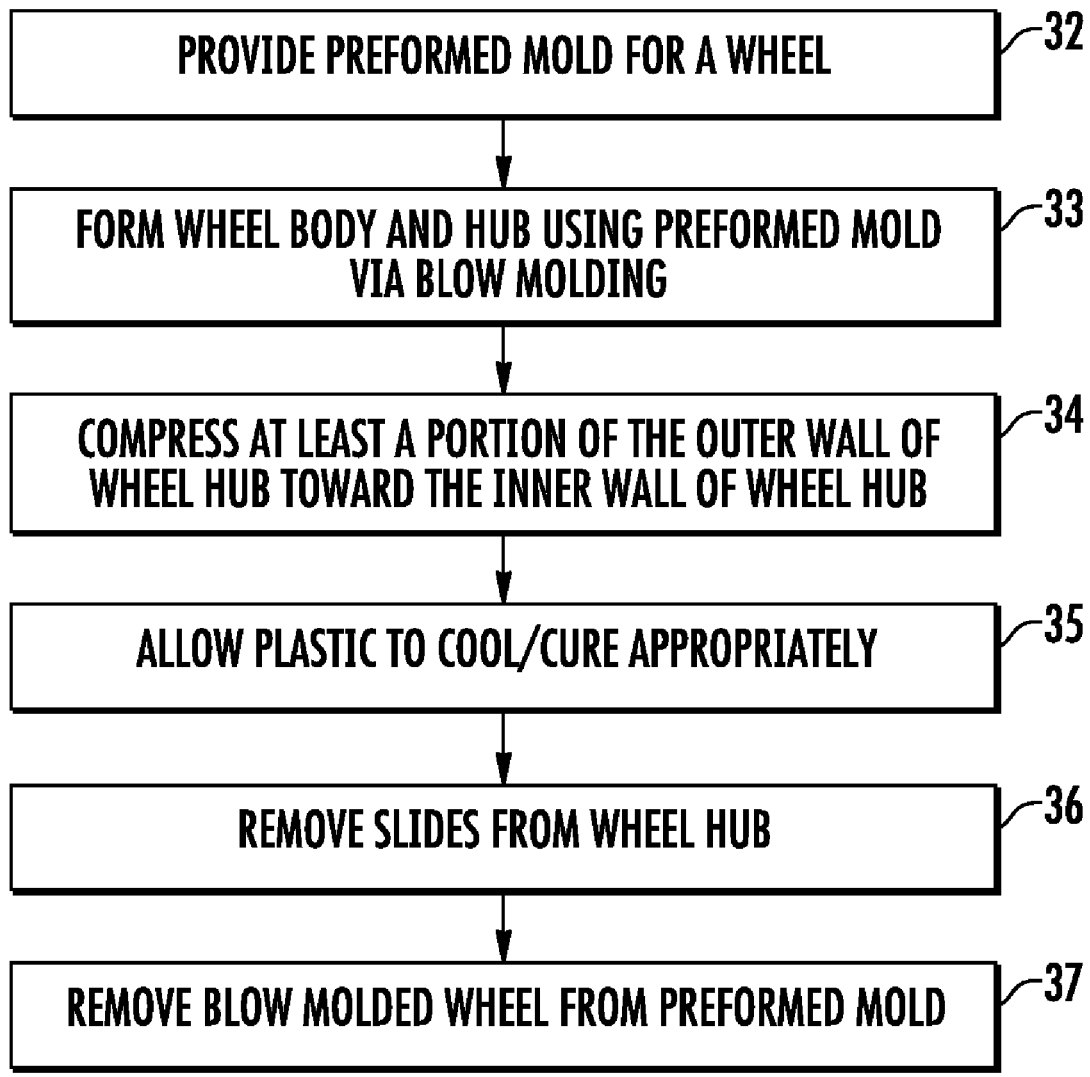
FIG. 19 is a flow chart of the method of forming the wheel as shown in FIGS. 3A-C.

An exemplary method 31 for fabricating wheel 1 will now be described with reference to the flow chart of FIG. 19. First, a preformed mold is provided that will be used to form the wheel 1 (block 32). Next, the wheel body 2 and the uncompressed hub 4 are integrally formed via blow molding (or injection molding) plastic or other material into the mold (block 33). Hydraulic slides 10 are moved to then compress at least a portion of outer wall 8 towards inner wall 7 deforming the outer wall 8 (block 34). Heat may be applied to the uncompressed hub 4 to facilitate deformation via the hydraulic slides 10. If heat was applied, the material of wheel 1 is allowed to cool and/or cure in order to harden the plastic (block 35). Hydraulic slides 10 are then released and removed from compressed hub 3 (block 36). The wheel 1 is then removed from the preformed mold (block 37).

Because the plastic density of compressed hub 3 is increased over uncompressed hub 4, compressed hub 3 may withstand a greater amount of force applied by an axle that is disposed within hub 3 or by any other force. Thus, the structural strength and wear characteristics of the hub are improved.

Figure 20:
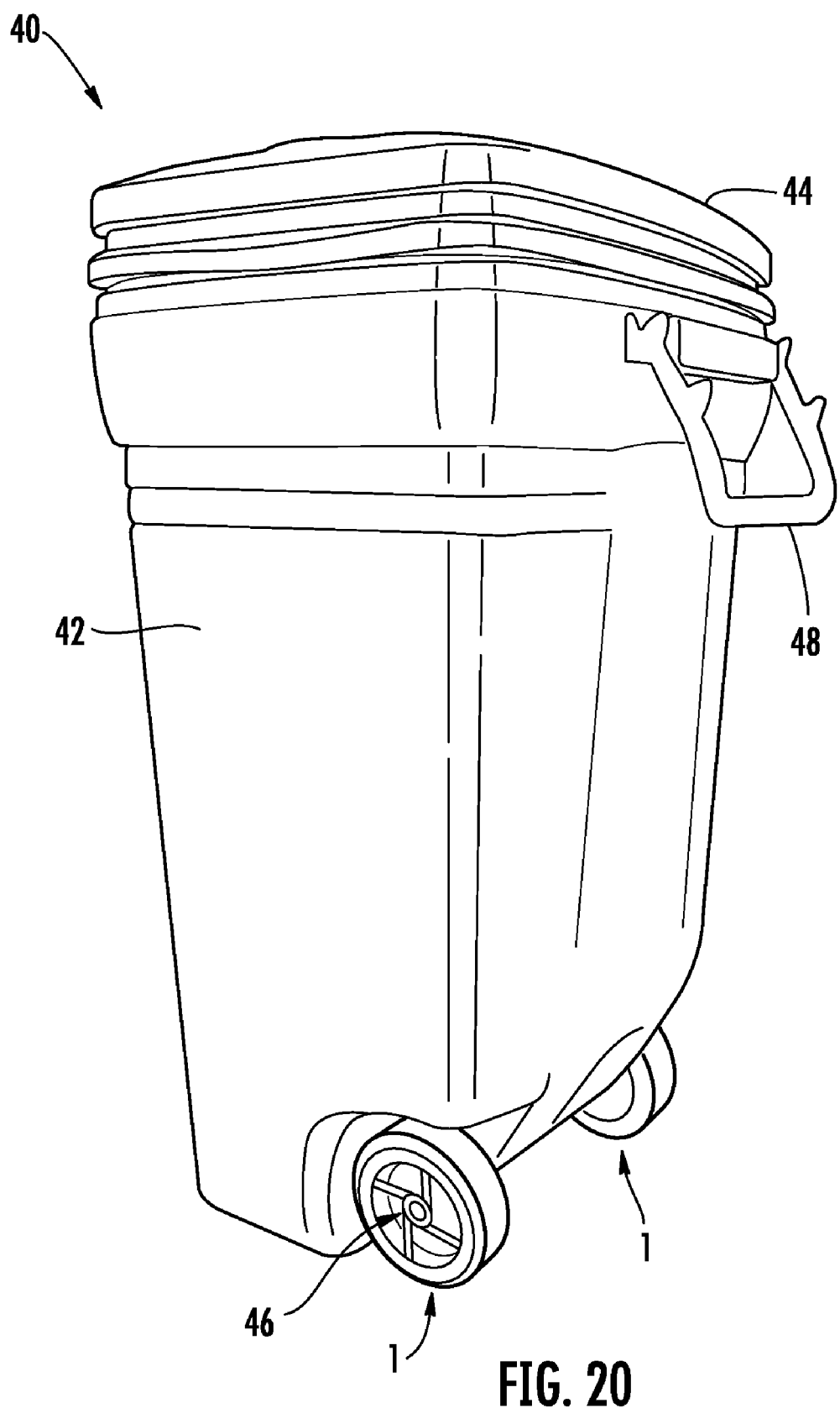
FIG. 20 is a perspective view of a waste receptacle with wheels according to one embodiment of the present invention.

In some embodiments, wheel 1 is suitable for use on lawn mowers, bins, containers, coolers, toy wagons, and other similar movable devices. For example, as illustrated in FIG. 20, wheel 1 is configured to attach to a waste receptacle 40. Waste receptacle 40 includes a container portion 42 for receiving objects, such as trash. Waste receptacle 40 may also include a lid 44 configured to cover an opening on the top of the waste receptacle 40. Further, waste receptacle 40 has at least one axle 46 connected to the bottom of the container portion 42. A handle 48 may be attached to the waste receptacle 40 in order to control movement of the waste receptacle 40. Two or more of the wheels 1 are rotatably attached to the waste receptacle on either side of the bottom of the container via one or more axles 46. The wheels 1 are located on the container portion 42 so that an operator may tilt the container portion 42 off of the ground using the wheels 1 and roll the waste receptacle. The central bore 11 of each wheel 1 is configured to receive axle 46. The axle 46 is secured to the wheel 1 to ensure that the wheel 1 is not easily disconnected from the axle 46, such as by a fastener.

Figure 21:
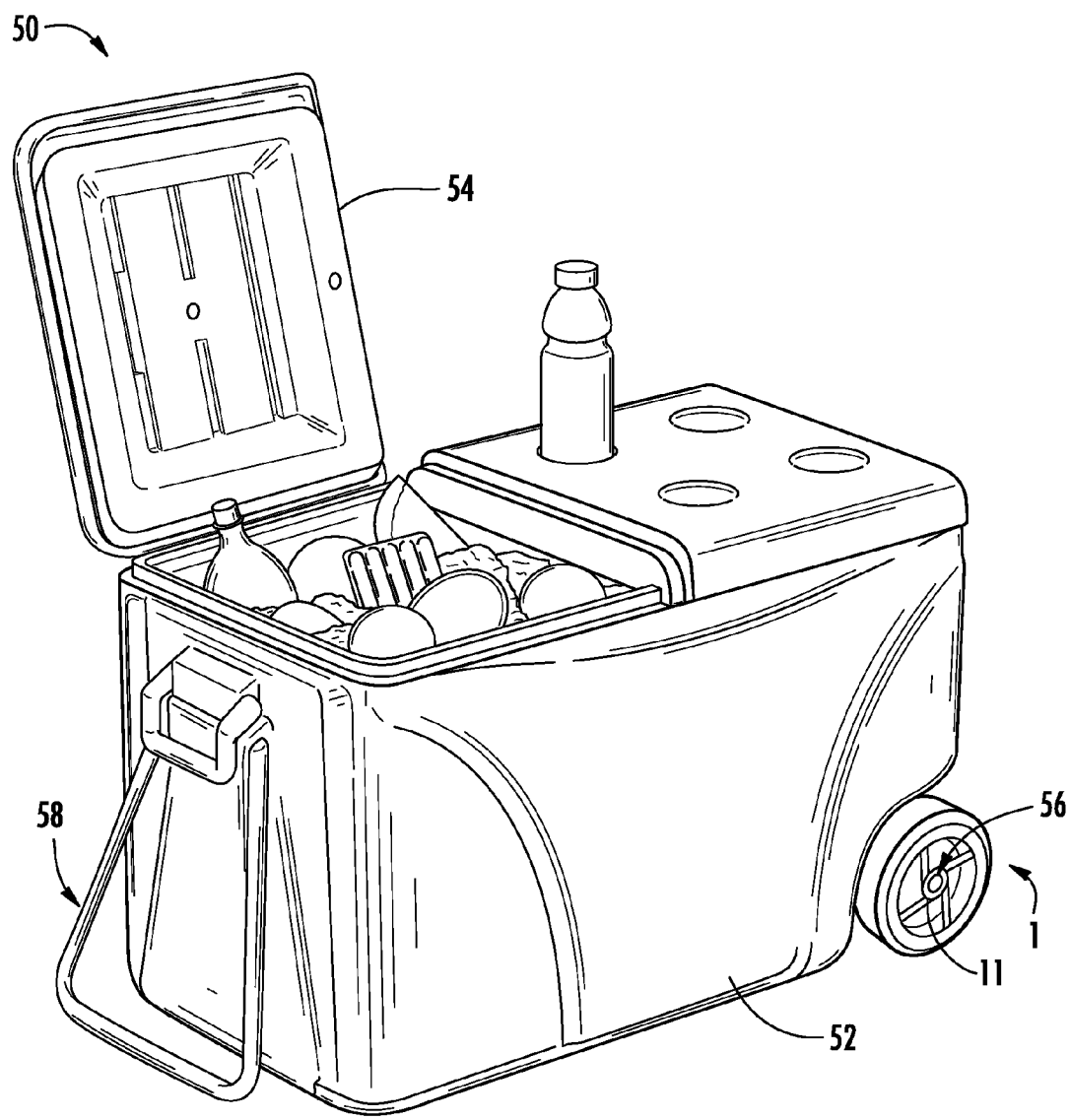
FIG. 21 is a perspective view of a cooler with wheels according to one embodiment of the present invention.

In another embodiment, as illustrated in FIG. 21, wheel 1 is configured to attach to a cooler 50 or any other insulated product. Cooler 50 includes a container portion 52 for receiving liquids and/or objects, such as drinks, ice and food. The container portion 52 may be insulated in order to minimize thermal energy transfer from the interior to the exterior of the container portion 52. Cooler 50 may also include a lid 54 configured to cover an opening on the top of the cooler 50. Further, cooler 50 has at least one axle 56 connected to the bottom of the container portion 52. A handle 58 may be attached to the cooler 50 in order to control movement of the cooler 50. Two or more of the wheels 1 are rotatably attached to the cooler 50 on either side of the bottom of the container 52 via one or more axles 56. The wheels 1 are located on the container portion 52 so that an operator may tilt the container portion 52 off of the ground using the wheels 1 and roll the cooler 50. The central bore 11 of each wheel 1 is configured to receive axle 56. The axle 56 is secured to the wheel 1 to ensure that the wheel 1 is not easily disconnected from the axle 56, such as by a fastener.

Although the arrangement of the wheel 1 on a waste receptacle 40 is detailed above, it should be understood that the wheel 1 may be attached to a waste receptacle 40 having other configurations and also to other objects.

Specific embodiments of an invention are described herein. One of ordinary skill in the art will recognize that the invention has other applications in other environments. In fact, many embodiments and implementations are possible. The following claims are in no way intended to limit the scope of the invention to the specific embodiments described above.

What is claimed is:

1. A molded plastic wheel adapted to mount to an axle comprising:
    a wheel body; and
    a hub formed from blow molded plastic and comprising:
        an outer wall,
        an inner wall, and
        an interior between the outer wall and inner wall, the interior having a material disposed therein,
    wherein the hub defines a central bore comprising a first open end and a second open end, the central bore being orientated along an axis, said hub extending along said axis, wherein the outer wall comprises a compressed portion, wherein the density of the material disposed in the interior is higher along the compressed portion than the density of the material along an uncompressed portion of the outer wall, the wheel further comprising at least one rib having a longitudinal axis, the longitudinal axis being substantially parallel to the inner wall.

2. The wheel of claim 1, wherein said outer wall is in direct contact with said inner wall.

3. The wheel of claim 1, wherein substantially no space is disposed at the interior between said outer wall and said inner wall.

4. The wheel of claim 1, wherein said inner wall and said outer wall comprise blow molded plastic.

5. The wheel of claim 4, wherein said wheel body is integrally blow molded with said inner wall and said outer wall to form a unitary blow-molded wheel.

6. The wheel of claim 1, wherein said rib is formed in said outer wall.

7. The wheel of claim 1, wherein said hub further comprises:
   a base wall proximate to said wheel body; and
   a distal end,
   wherein said outer wall extends perpendicularly from said base wall toward said distal end of said hub,
   wherein said distal end of said hub comprises:
      a first wall perpendicular to said outer wall and extending outwardly from said outer wall away from said inner wall; and
      a second wall connecting said first wall with said inner wall, said first and second walls defining a hub end cavity therebetween, said hub end cavity being separate from an interior cavity of said hub.

8. A waste receptacle, comprising:
   a container for receiving material; and
   at least one wheel rotatably attached to said container, each of said at least one wheel comprising:
   a wheel body; and
   a hub formed from blow molded plastic and comprising:
      an outer wall,
      an inner wall, and
      an interior between the outer wall and inner wall, the interior having a material disposed therein,
   wherein the hub defines a central bore comprising a first open end and a second open end, the central bore being orientated along an axis, said hub extending along said axis, wherein the outer wall comprises a compressed portion, wherein the density of the material disposed in the interior is higher along the compressed portion than the density of the material along an uncompressed portion of the outer wall, the wheel further comprising at least one rib having a longitudinal axis, the longitudinal axis being substantially parallel to the inner wall.

9. A cooler, comprising:
   an insulated container for receiving material; and
   at least one wheel rotatably attached to said container, each of said at least one wheel comprising:
   a wheel body; and
   a hub formed from blow molded plastic and comprising:
      an outer wall,
      an inner wall, and
      an interior between the outer wall and inner wall, the interior having a material disposed therein,
   wherein the hub defines a central bore comprising a first open end and a second open end, the central bore being orientated along an axis, said hub extending along said axis, wherein the outer wall comprises a compressed portion, wherein the density of the material disposed in the interior is higher along the compressed portion than the density of the material along an uncompressed portion of the outer wall, the wheel further comprising at least one rib having a longitudinal axis, the longitudinal axis being substantially parallel to the inner wall.

\* \* \* \* \*